United States Patent Office 3,274,145
Patented Sept. 20, 1966

3,274,145
NOVEL SILOXANE COMPOSITIONS
Wayne P. Dupree, St. Charles, Mich., assignor to Dow Corning Corporation, Midland, Mich., a corporation of Michigan
No Drawing. Filed Sept. 4, 1962, Ser. No. 221,314
8 Claims. (Cl. 260—37)

This invention relates to new organosilicon compositions which are stable in the absence of moisture and which cure on exposure to said moisture to a rubbery, coherent solid.

Organosilicon compounds that cure at normal temperatures are now well known in the art and widely used in commerce. Many of the compositions that will so vulcanize are of the two-package type; that is, there are two portions that, when mixed, will thereby vulcanize, the said process occurring immediately upon mixing, so that once the two components are mixed the resulting blend must be applied where desired within a short time, else the mixture sets up and is lost.

Recent room temperature vulcanizing silicones that are available are of the one-package type. These materials do not vulcanize until removed from their storage container. Thus, the unused portion is not wasted unless it should be removed from its container. Often these materials are stored in vessels suitable for use with calking guns and similar equipment. It is this latter type of room temperature vulcanizing material to which the composition of this invention is similar.

Most room temperature curing organosilicon compounds are made as pourable or flowable materials that are easily formed as, for example, a paste which can be squeezed from a calking gun for sealing such as building joints, or a pourable fluid which can be poured around such as an electronic component to encapsulate the said component, after which applications the pourable or flowable organosilicon compound cures to a coherent, rubbery solid. The one-component systems are especially useful in such applications as the above and others for the reasons already asserted.

A problem arising from the use of presently available flowable or pourable organosilicon compositions that cure at room temperature is that the cured material is often more rubbery—that is, it has a higher modulus—than desirable. In building joint sealant applications, for example, thermally caused dimensional changes assert a large stress on the sealants. The quite rubbery cured compounds respond with occasionally sufficient strain to rupture one or more of the bonds forming the seal, and usually rupture the material to which they adhere in the case of masonry building materials. In either event, of course, the seal is broken, requiring repair or replacement of the sealant material.

In order to avoid the above-described condition, room temperature pourable and flowable organosilicon compositions have been formulated with a diluent which does not enter into or affect the curing reaction, but which functions as a plasticizer in the cured material to reduce its rubberiness to an acceptably low value.

While the said diluent has been effective for the above stated purpose, it has introduced a new problem. Because the said plasticizing diluent is inert, i.e. does not join in the curing reaction, it is free to migrate out of the curred composition, which it does. In doing so, it leaves the cured composition once again in the above stated highly rubbery condition with the attended already stated problems. Further, the said diluent, being a virtually non-volatile material, has been known to promote staining of the adjacent materials onto and into which it migrates. Thus, the solution to one problem was indeed only a transient solution, and further created a new problem.

It is an object of the present invention to provide a stable, storable organosilicon composition. A further object of this invention is to provide a stable, storable organosilicon composition which cures on exposure to moisture. Another object is to provide a room temperature curing organosilicon composition which provides a low degree of rubberiness, or low modulus. Still another object is to provide a room temperature curing organosilicon composition which provides a low degree of rubberiness, which composition does not contain a plasticizer which bleeds out. Still another object is to provide a room temperature curing organosilicon composition suitable for a building sealant which has a low modulus and does not contain materials which migrate out of the cured composition to stain adjacent material. These and other objects will apparent from the following description.

This invention relates to a composition of matter comprising the reaction product of (1) an essentially diorganopolysiloxane having a viscosity of at least 100 cs. at 25° C., in which siloxane the terminal radicals are in part hydroxyl radicals and in part triorganosiloxane radicals such that more than half of the said terminal radicals are hydroxyl radicals, the organic radicals of the said polysiloxane and said triorganosiloxane radicals each being selected from the group consisting of monovalent hydrocarbon radicals and monovalent halohydrocarbon radicals and (2) a silane of the formula

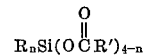

$$R_nSi(O\overset{O}{\underset{\|}{C}}R')_{4-n}$$

wherein R is selected from the group consisting of monovalent hydrocarbon radicals and monovalent halohydrocarbon radicals, R' is selected from the group consisting of hydrogen and alkyl radicals and n has a value from 0 to 1 inclusive, which reaction product is stable in the absence of moisture, and which, upon exposure to moisture, cures to a coherent, rubbery solid.

Diorganosiloxane (1) can be have a viscosity of 100 cs. or higher, measured at 25° C. For applications wherein the composition is to be pourable, viscosities from 100 cs. to about 10,000 cs. are preferred. For flowable materials, viscosities from about 10,000 cs. to about 500,000 cs. are preferred. For non-flowable materials, viscosities above about 500,000 cs., ranging up to 100,000,000 cs. and higher are preferred.

Diorganopolysiloxane (1) should be composed essentially of diorganosiloxane units, but it is understood in the art that monoorganosiloxane and $SiO_2$ units can be present, provided these are not present in sufficient amounts to affect the essentially diorganosiloxane character of the polysiloxane. When present, these latter units ordinarily constitute less than 1 percent of the siloxane units.

The terminal radicals of siloxane (1) are in part silicon-bonded hydroxyl radicals and in part triorganosiloxane radicals, more than half of the said terminal radicals being silicon-bonded hydroxyl radicals. The rubberiness, or modulus, of the cured material is a function of the amount of triorganosiloxane endblocking of polysiloxane (1) for any given viscosity of siloxane (1). When there is very little triorganosiloxane endblocking, the modulus of the cured siloxane approaches that of a siloxane containing no triorganosiloxane groups therein. When the triorganosiloxane endblocking nearly equals the silicon-bonded hydroxyl endblocking, the modulus is quite low. When the triorganosiloxane endblocking exceeds the silicon-bonded hydroxyl endblocking, the cure of the siloxane is often incomplete, and some of the polysiloxane does not participate in the curing reaction; thus the said inert portion is free to bleed out. It is, therefore, important to have as a majority of terminal groups silicon-bonded hydroxyl radicals. It is also to be noted that the reduction of modulus of the cured material can be easily controlled to a desired degree by the amount of triorganosiloxane end groups employed.

The use of a polysiloxane such as siloxane (1) wherein part of the terminal radicals are triorganosiloxane radicals provides not only a convenient method of controlling the modulus of the cured compound, but the modulus controlling mechanism becomes a chemically combined part of the said cured composition. Thus, the "plasticizing" part of the cured composition is held in, and is not able to migrate and bleed out of the material. Therefore, the cured composition maintains its desired modulus when, for example, it is used as a building sealant, and there is no immigration from the cured composition with subsequent staining of the material adjacent to the cured compound.

The organic radicals of siloxane (1) and of the triorganosiloxane units therein can be any organic radicals as stated above. Thus, the organic radicals can be alkyl radicals such as methyl, ethyl, isopropyl, t-butyl, and octadecyl; alkenyl radicals such as vinyl, allyl, methallyl and butadienyl; alkynyl radicals such as ethynyl; cycloaliphatic radicals such as cyclobutyl, cyclopentenyl and cyclohexadienyl; aryl radicals such as phenyl, xenyl, naphthyl and anthracyl; alkaryl radicals such as tolyl and xylyl; aralkyl radicals such as benzyl and phenethyl; and halogenated derivatives of the above said radicals such as chloromethyl, 3,3,3-trifluoropropyl, 4-bromo-2-butenyl, 2,3-dichlorocyclopentyl, tetrachlorophenyl, alpha,alpha,alpha-trifluorotolyl and bromobenzyl. The said organic radicals can be the same or different in each case. Thus, polysiloxane (1) can be, for example, a dimethylpolysiloxane endblocked in major part by silicon-bonded hydroxyl radicals and in minor part by trimethylsiloxy radicals, a copolymer containing methylethylsiloxane units and phenylvinylsiloxane units, endblocked in major part by silicon-bonded hydroxyl radicals and in minor part by hexylallylpropylsiloxane radicals, or a copolymer of cyclohexyl-3,3,3-trifluoropropyl siloxane units endblocked in major part by silicon-bonded hydroxyl radicals and in minor part by phenylmethylvinyl siloxane radicals. In addition, polysiloxane (1) can be a mixture of copolymers within the limitation hereinabove set forth. For example, polysiloxane (1) can be a mixture of any two or more of the copolymers described above. Further, polysiloxane (1) can be a mixture of one or more of the above described copolymers and a hydroxyl endblocked diorganopolysiloxane.

The above-described siloxanes can be prepared in at least four ways. In the first method, the calculated amount of triorganosiloxane is added as either the hexaorganodisiloxane, or preferably as a low molecular weight triorganosilyl endblocked diorganosiloxane, to the desired quantity of diorganosiloxane fluid, which can be a cyclic polymer, a linear hydroxyl endblocked fluid or both, and the mixture is subjected to the action of a bond-rearranging catalyst e.g. potassium hydroxide under conditions whereby the desired end viscosity of the polymer is obtained, i.e. in the presence of a calculated amount of moisture. Thereafter the catalyst is preferably deactivated or removed. This last step is accomplished in the case of catalysts active only at elevated temperatures merely by cooling the product to room temperature.

Suitable bond-rearranging catalysts include alkaline catalysts such as the alkali metal hydroxides, alkoxides and silanolates, tetraorganoammonium bases and tetraorganophosphonium bases. The latter two can be in the form of hydroxides or silanolates. Suitable acidic catalysts include such as sulfuric acid and phosphoric acid.

Diorganopolysiloxane (1) can be prepared also by combining a mixture of hydroxyl endblocked diorganosiloxane and a triorganosilanol or triorganosilyldisiloxanol, one example of the latter being (CH₃)₃Si[OSi(CH₃)₂]₃OH, employing catalysts that condense silicon-bonded hydroxyl groups to siloxanes, terminating the reaction when the desired degree of polymerization, and thus the desired ratio of triorganosiloxane to silicon-bonded hydroxyl endblocking, is obtained. Suitable catalysts for this reaction include calcium oxide, organic monoisocyanates, organosilicon monoisocyanates, organic- and organosiliconamine carboxylates, alkali metal salts of phenolic compounds, beta-amino carboxylic acids (as disclosed in U.S. Patent No. 2,902,468), etc.

A third method of preparing siloxane (1) of the instant invention is to react a triorganohalosilane with a hydroxyl endblocked diorganopolysiloxane, employing an acid acceptor. In this method, the acid acceptor, which can be pyridine, picoline, tributylamine, ammonia, etc. and the hydroxyl endblocked diorganopolysiloxane are mixed, usually in a mutual solvent inactive toward the reactants, and the triorganohalosilane added thereto, with stirring. The reaction occurs at room temperature, but heat can be employed if desired, though this is unnecessary as the reaction is often exothermic. After the reaction, the acid acceptor, which is now a hydrohalide, is removed.

Siloxane (1) can be prepared in a fourth method merely by mixing a hydroxyl endblocked diorganopolysiloxane with a diorganopolysiloxane which is endblocked on one end with a triorganosiloxane group and on the other end by a hydroxyl group. In this latter compound the viscosity, or degree of polymerization, can be quite low. Two examples that illustrate this latter compound are (a)

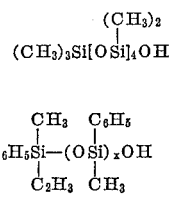

and (b)

$$C_6H_5Si\begin{matrix}CH_3\\|\\-(OSi)_x\\|\\C_2H_5\end{matrix}\begin{matrix}C_6H_5\\|\\OH\\|\\CH_3\end{matrix}$$

having a viscosity of 200 cs. at 25° C. The resulting mixture should have a viscosity of at least 100 cs. at 25° C. Thus, when employing a compound such as (a) above in any appreciable quantity, it is necessary that the hydroxyl endblocked diorganopolysiloxane have a viscosity sufficiently above 100 cs. that the resulting mixture will have a viscosity of at least 100 cs. It is, of course, obvious that by this method the triorganosiloxane endblocking can never become equal to the hydroxyl endblocking, and further that a very fine control of the ratio of the two types of endblocking units is possible by this method.

All of the above methods allow one skilled in the art to produce siloxanes (1) predictably and reproducibly. While the above methods are among the best method of preparing siloxane (1), this invention is not restricted by the method of preparation of this component. A product made by any method which produces component (1) of this invention will function herein to produce the instant invention.

Silane (2) is of the formula

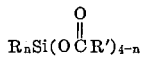

In silane (2) R can be any monovalent hydrocarbon or halohydrocarbon radical, such as alkyl, such as methyl, ethyl, isopropyl, tertiary-amyl and octadecyl; alkenyl such as vinyl, allyl and butadienyl; alkynyl such as butynyl; cycloaliphatic such as cycloamyl and cyclohexenyl; aryl such as phenyl, xenyl and naphthyl; alkaryl such as tolyl; aralkyl such as benzyl; and halogenated derivatives of the above said radicals such as 3,3,3-trifluoropropyl, 4-chlorobutyl, 3-bromoallyl, 2-bromocycloamyl, dichlorophenyl, trifluorotolyl and dibromobenzyl.

In silane (2), radical R' can be hydrogen or any alkyl radical such as methyl, ethyl, propyl, butyl and octadecyl, the said radicals being both straight and branched chain. Preferred radicals on account of their greater reactivity impartation to the

radical are hydrogen and the methyl and ethyl radicals. However, any of the above said radicals and hydrogen will function in this invention.

The methods of preparing silane (2) are well known in the art. There can be mentioned one here, which is the reaction of an acyl anhydride with a halosilane, illustrated by the following reaction between acetic anhydride and propyltrichlorosilane:

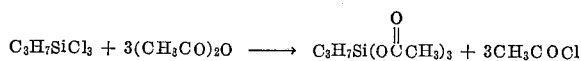

The reaction occurs spontaneously at roomtemperature, but can be carried out at an elevated temperature sufficient to cause volatilization of the by-product acyl halide (in this case acetyl chloride). Reduced pressure aids the progress of the reaction, and can reduce the temperature necessary for a reasonable reaction rate. Alternatively, the reaction can be carried out at any temperature of from room temperature and above, and the products separated by distillation.

The composition of this invention is prepared by reacting in the substantial absence of moisture siloxane (1) and silane (2). There should be at least one mol of silane (2) per mol of silicon-bonded hydroxyl radicals in siloxane (1). For practical operation, it is best to employ more than 1 mol of silane (2) per mol of silicon-bonded hydroxyl radical of siloxane (1). This excess of silane (2) insures complete reaction with all of the silicon-bonded hydroxyl radicals and further acts as a scavenger for any moisture which may be present. A reaction occurs spontaneously upon mixing the two components. The two components can be mixed at any convenient temperature generally in the range from room temperature up to 200° C. The reaction can be carried out in a mutual solvent if desired.

If desired, various other ingredients can be present such as fillers, flame retardants, stabilizing agents and plasticizers such as siloxane fluids. Suitable fillers include powdered metals such as aluminum, tin and zinc; powdered silicon, silica, mica, clay and metal oxides such as iron oxide. Suitable flame retardants are antimony oxide, polychlorinated hydrocarbons such as polychlorinated biphenyls and polychlorinated paraffin oils and organic sulfamates. In addition, carboxylic acid salts of metals ranging from lead to manganese inclusive in the electromotive series of metals can be included. The said salts are monocarboxylic or dicarboxylic acid salts, and can be included where it is desired to obtain better surface cure of the instant composition when it is employed in very humid conditions.

The compositions of this invention are useful as coatings generally and as sealants, especially building joint sealants for metal, wood or masonry. The instant compositions can also be employed in such other applications as potting and encapsulation.

The following examples are illustrative only and are not to be construed as limiting the invention which is properly delineated in the appended claims. In the examples, viscosities were measured at 25° C.

EXAMPLE 1

A. A mixture of 200 g. of a hydroxyl endblocked dimethylpolysiloxane fluid having a viscosity of 2250 cs. and 1.1 ml. of alpha-picoline was dissolved in 300 g. of toluene, and cooled to about 5° C. There was added thereto slowly while stirring 0.99 g. of trimethylchlorosilane dissolved in about 2 ml. of toluene. After complete addition, the mixture was stirred an additional half hour, after which it was allowed to warm to room temperature, with continued stirring. The alpha-picoline hydrochloride salts were removed by washing the organosiloxane solution with dilute aqueous hydrochloric acid, employing enough hydrochloric acid to insure removal of the excess alpha-picoline, and thereafter the solution washed neutral with water. The toluene and any remaining water were removed by vacuum stripping. The product had a viscosity of 2240 cs.

B. A 200 g. portion of a hydroxyl endblocked dimethylpolysiloxane having a viscosity of 500 cs. was modified as above, using 2 ml. of alpha-picoline and 1.81 g. of trimethylchlorosilane.

C. A 200 g. portion of a hydroxyl endblocked dimethylpolysiloxane having a viscosity of 13,000 cs. was modified as in A, using 0.5 cc. of alpha-picoline and 0.52 g. of trimethylchlorosilane.

Each of the above fluids form a stable reaction product when mixed with vinyltriacetoxysilane, which product cures on exposure to atmospheric moisture to a rubbery coherent solid.

EXAMPLE 2

A. The following mixture was made on a 2-roll rubber mill:

100 parts of a hydroxyl endblocked dimethylpolysiloxane having a viscosity of 14,000 cs., 60 parts of the fluid product of Example 1C above, 15 parts of a silica organogel having on the surface thereof trimethylsilyl groups in the ratio 0.11 mol $Me_3Si:1$ mol $SiO_2$ in the silica, and having a surface area of 250 square meters per gram, and 5 parts of vinyltriacetoxysilane.

The mixture was pressed into a flat sheet about 1/16 inch thick and exposed to atmospheric moisture for 24 hours at room temperature.

B. A second sample was prepared similar to the first, except there was substituted for the fluid of Example 1C 40 parts of a trimethylsiloxy endblocked dimethylsiloxane fluid of 1,000 cs. viscosity.

C. A third sample was prepared similar to the first sample, except that the fluid of Example 1C was omitted.

All three samples cured to elastomers in 24 hours. Tests were made on the elastomers as follows:

(1) *Modulus.*—Tensile tests were made on portions of each sample and the stress at strains of 50%, 100% and 200% were determined. These are shown below as moduli at, respectively, 50, 100 and 200% elongation. A low modulus is desirable in building sealant applications.

(2) *Extractables.*—Portions of each sample were swollen 24 hours in toluene, then dried. The swelling process was repeated a second time using a fresh quantity of toluene. The weight loss after this treatment was expressed in percentage of original weight of sample and is the percent of extractable material. Extractable material is that not chemically combined in the cured elastomer and is therefore that portion which can bleed or be squeezed or exude from the curing material. A low percentage of extractables is desirable, particularly in building sealant applications.

*Table I*

| Sample | Modulus, p.s.i. | | | Extractables, percent |
|---|---|---|---|---|
| | 50% | 100% | 200% | |
| 2A | 42 | 60 | 95 | 5.5 |
| 2B | 25 | 45 | 75 | 20.8 |
| 2C | 65 | 102 | 165 | 4.0 |

In the results shown in Table I, it is clearly seen that the sample made using the composition of this invention (Sample 2A) has a modulus approaching that of a similar sample modified with an inert plasticizer (2B), which latter sample did show a high migration, as exemplified by the high percentage of extractables. However, the sample from the composition of this invention has only slightly more extractables than a sample without a plasticizer (Example 2C), which sample has a much higher modulus.

EXAMPLE 3

2,000 pounds of cyclic dimethylsiloxanes, 4,000 grams of a trimethylsiloxy endblocked dimethylsiloxane having a viscosity of 10 cs. (2 grams of the said 10 cs. fluid per pound of cyclics) and 162 grams of powdered potassium hydroxide were charged to a closed reactor and heated 3½ hours at 150° C. During the reaction, sufficient steam was introduced to give the desired viscosity of the finished polymer. After 3½ hours, the sample was cooled to room temperature, saturated with carbon dioxide, filtered and stripped to 150° C./1 mm. to remove any volatile material. The finished product was clear and bright, having a viscosity of 10,000 cs.

In a similar manner, 10,000 cs. fluids were made wherein the amount of trimethylsiloxy endblocked dimethylsiloxane fluid (10 cs.) was varied from 1,000 grams to 7,000 grams per 2,000 pounds of dimethylsiloxane cyclics (0.5 gram to 7 grams per pound of cyclics). All fluids had the same final viscosity of 10,000 cs. For convenience, the fluids are identified below by the weight in grams of the trimethylsiloxy endblocked dimethylsiloxane fluid (10 cs.) added per pound of dimethylsiloxane cyclics in the preparation of the polymers. For example, the fluid wherein the charged ratio was 2 grams of the said 10 cs. fluid per pound of dimethylsiloxane cyclic is referred to simply as the 2 g./lb. fluid.

Elastomers were made using each of the polymers above by preparing a mixture of:

140 parts of one of the above said polymers, 14 parts of a fume silica having a surface area of 200 square meters per gram, and 10 parts of methyltriacetoxysilane, and pressing the above mixture into a flat sheet as in Example 2 and allowing the said sheet to cure 24 hours at room temperature by exposure to atmospheric moisture. The polymers used are identified in Table II.

These elastomers were tested in the same manner as those of Example 2. The modulus at 100% elongation is reported herein.

Table II

| Sample | Polymer | Modulus (100%) | Extractables percent |
|---|---|---|---|
| 1 | ½ g./lb | 75 | 2½ |
| 2 | 1 g./lb | 70 | 3½ |
| 3 | 1½ g./lb | 50 | 5½ |
| 4 | 2 g./lb | 45 | 7½ |
| 5 | 2½ g./lb | 35 | 11 |
| 6 | 3½ g./lb | 25 | 15 |
| 7 | (Mix)¹ | 55 | 20 |

¹ This is 100 parts of a hydroxyl endblocked dimethylpolysiloxane fluid having a viscosity of 14,000 cs. and 40 parts of a trimethyl endblocked dimethylpolysiloxane having a viscosity of 1,000 cs., an inert plasticizer. This sample, which is nearly identical to Example 2C, is included for comparison.

It is readily seen that Sample No. 3 has about the same modulus as Sample No. 7, the example with an inert plasticizer, but that Sample No. 3 has only ¼ the extractables as Sample No. 7. This series also illustrates the fine control possible of both modulus and percent extractables utilizing the composition of the instant invention.

EXAMPLE 4

When any of the following mixtures are caused to react, fluids having both hydroxyl and triorganosilyl endblocking are formed, there being in each more hydroxyl endblocking units than triorganosilyl endblocking units.

A. 100 parts of a hydroxyl endblocked phenylmethylpolysiloxane having a viscosity of 250 cs., 0.2 part of octadecyldimethylsilanol and 1.0 parts of calcium oxide.

B. 100 parts of a hydroxyl endblocked copolymer siloxane fluid containing 5 mol percent chloromethylmethylsiloxane units, 15 mol percent cyclopentylethylsiloxane units, 2 mol percent methylvinylsiloxane units, 77.5 mol percent xenylethylsiloxane units, 0.4 mol percent propylsiloxane units and 0.1 mol percent $SiO_2$ units, having a viscosity of 1,000 cs., 0.02 part of diethylphenylsilanol, 0.01 part of vinyldiphenylsilanol and 0.5 part of phenyl isocyante in 600 parts of toluene.

C. 100 parts of a hydroxyl endblocked 3,3,3-trifluoropropylmethylpolysiloxane saturated with anhydrous ammonia, having a viscosity of 400 cs., and 0.3 part of vinyl-3,3,3-trifluoropropylmethylchlorosilane, with more anhydrous ammonia added as needed during the reaction.

D. 50 parts of a hydroxyl endblocked benzylethylpolysiloxane having a viscosity of 40,000 cs., 50 parts of a hydroxyl endblocked dimethylpolysiloxane of viscosity 100,000 cs., 0.02 part of chlorophenyldimethylchlorosilane, and 1 part of tributylamine in 250 parts of dibutylether.

Each of the above products will form a reaction product when mixed with vinyltriacetoxysilane, which reaction product is stable in the absence of moisture and cures to a coherent solid when exposed to moisture.

EXAMPLE 5

Equivalent results are obtained when any of the following acyloxysilanes are substituted for methyltriacetoxysilane of Example 4:

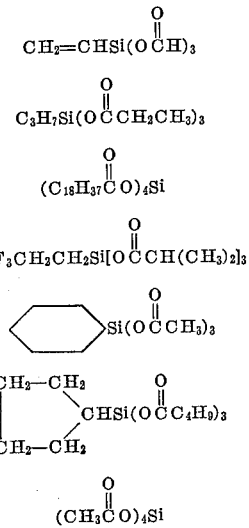

or a mixture of two or more of the above acyloxysilanes.

That which is claimed is:

1. A composition of matter comprising the reaction product of (1) an essentially diorganopolysiloxane having a viscosity of at least 100 cs. at 25° C., in which siloxane the terminal radicals are in part hydroxyl radicals and in part triorganosiloxane radicals such that more than half of the said terminal radicals are hydroxyl radicals, the organic radicals of the said siloxane and said triorganosiloxane radicals each being selected from the group consisting of monovalent hydrocarbon radicals and monovalent halohydrocarbon radicals, and said diorganopolysiloxane being a mixture consisting essentially of a hydroxyl endblocked diorganopolysiloxane and a diorganopolysiloxane being endblocked on one end with a triorganosiloxane group and on the other end by a hydroxyl group, and (2) at least one mol per mol of silicon-bonded hydroxyl radicals of polysiloxane (1) of a silane of the formula

wherein R is selected from the group consisting of monovalent hydrocarbon radicals and monovalent halohydrocarbon radicals, R' is selected from the group consisting of hydrogen and alkyl radicals and $n$ has a value from 0 to 1 inclusive, which reaction product is stable in the absence of moisture, and which, upon exposure to moisture, cures to a coherent, rubbery solid.

2. A stable, storable composition comprising (A) the reaction product of (1) an essentially diorganopolysiloxane having a viscosity of at least 100 cs. at 25° C., in which siloxane the terminal radicals are in part hydroxyl radicals and in part triorganosiloxane radicals such that more than half of the said terminal radicals are hydroxyl radicals, the organic radicals of the said siloxane and said triorganosiloxane radicals each being selected from the group consisting of monovalent hydrocarbon radicals and monovalent halohydrocarbon radicals, and said diorganopolysiloxane being a mixture consisting essentially of a hydroxyl endblocked diorganopolysiloxane and a diorganopolysiloxane being endblocked on one end with a triorganosiloxane group and on the other end by a hydroxyl group, and (2) at least one mol per mol of silicon-bonded hydroxyl radicals of polysiloxane (1) of a silane of the formula

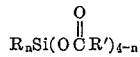

wherein R is selected from the group consisting of monovalent hydrocarbon radicals and monovalent halohydrocarbon radicals, R' is selected from the group consisting of hydrogen and alkyl radicals and $n$ has a value from 0 to 1 inclusive, which reaction product is stable in the absence of moisture, and which, upon exposure to moisture, cures to a coherent, rubbery solid and (B) a filler.

3. The composition according to claim 1 wherein the organic radicals of (1) are methyl and in (2) R' is methyl.

4. The composition according to claim 1 wherein the organic radicals of (1) are methyl and 3,3,3-trifluoropropyl.

5. The composition according to claim 2 wherein the organic radicals of (1) are methyl and in (2) R' is methyl.

6. The composition according to claim 1 wherein (2) is methyltriacetoxysilane.

7. The composition according to claim 2 wherein component (2) is methyltriacetoxysilane.

8. The composition according to claim 2 wherein filler (B) is a silica.

References Cited by the Examiner

UNITED STATES PATENTS

| | | |
|---|---|---|
| 2,744,079 | 5/1956 | Kilbourne et al. |
| 3,035,016 | 5/1962 | Bruner. |
| 3,105,061 | 9/1963 | Bruner _____ 260—18 |

FOREIGN PATENTS

| | | |
|---|---|---|
| 835,790 | 5/1960 | Great Britain. |

MORRIS LIEBMAN, *Primary Examiner.*

J. W. BEHRINGER, J. H. DERRINGTON,
*Assistant Examiners.*